United States Patent Office 3,021,421
Patented Feb. 13, 1962

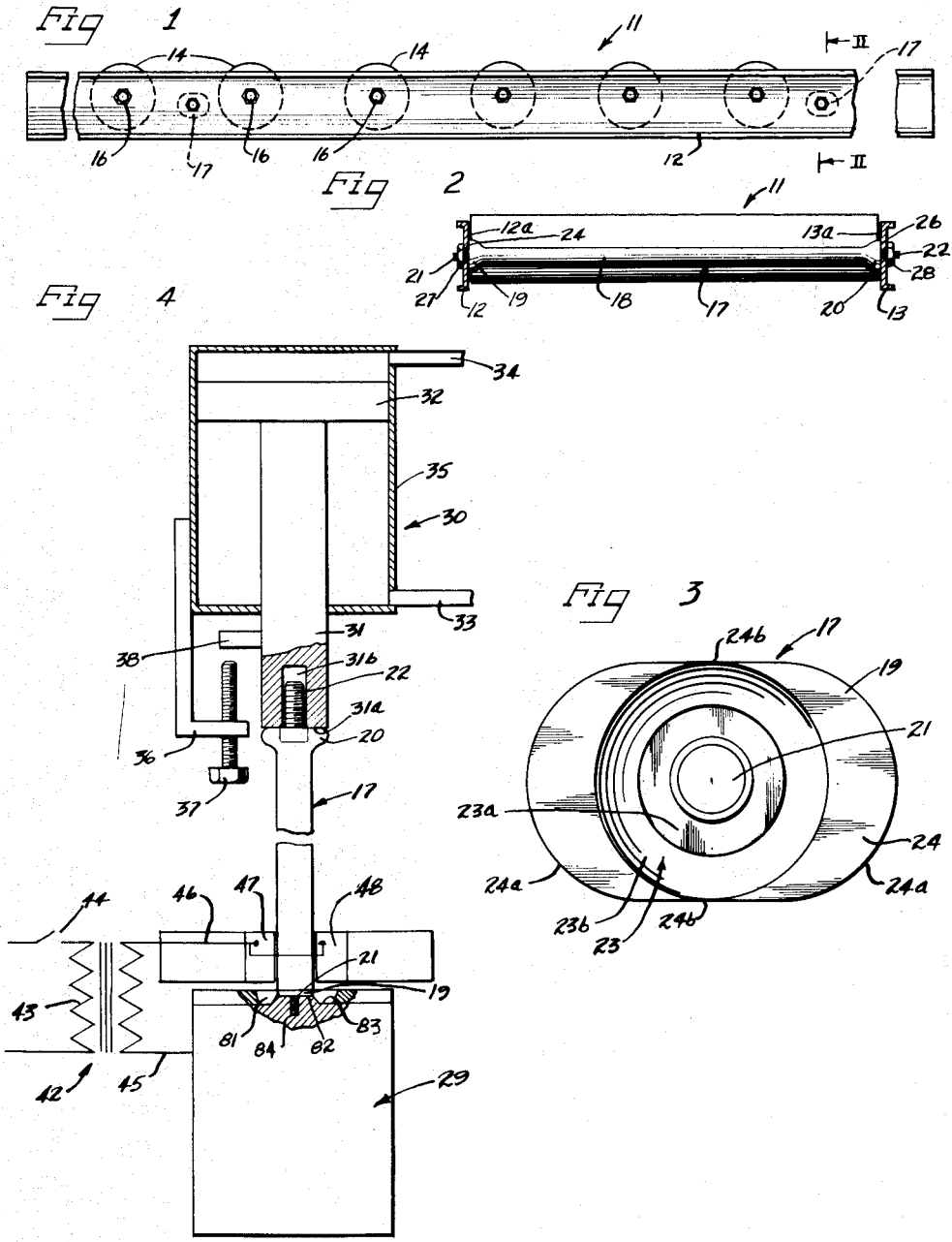

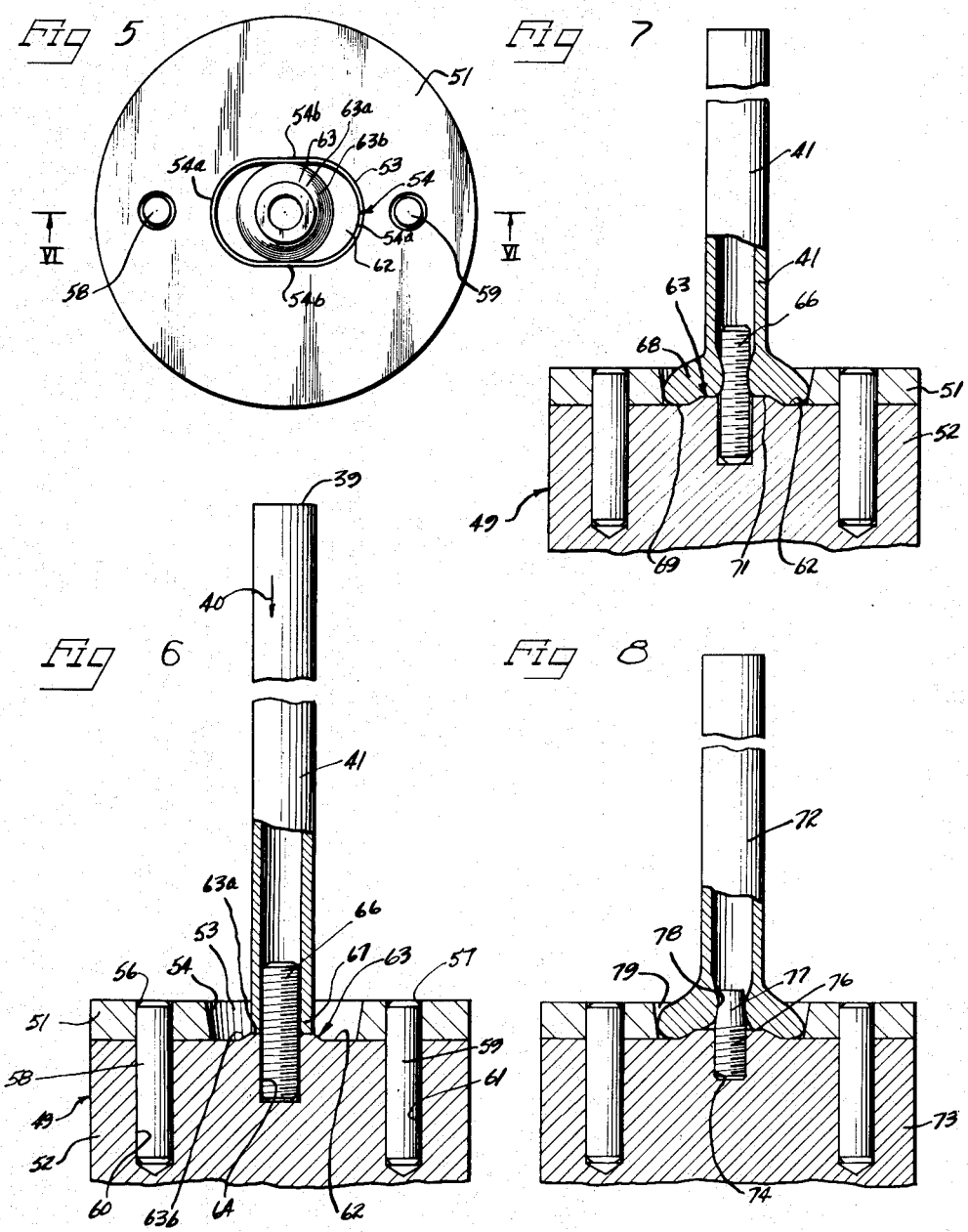

3,021,421
METAL GATHERING PROCESS AND ARTICLES PRODUCED THEREBY
Heber Linden Orgill, La Mirada, Calif., assignor to Thompson Ramo Wooldridge Inc., a corporation of Ohio
Filed Oct. 15, 1958, Ser. No. 767,367
7 Claims. (Cl. 219—150)

The present invention relates to improvements in spacer bars and more particularly to an improved end structure for a spacer bar and an improved method of apparatus for making the end structure so that spacer bars of precise accurate length can be manufactured.

The invention contemplates the manufacture of an improved spacer bar of the type used in the fabrication of roller conveyors. In a roller conveyor a plurality of parallel spaced rollers are supported on external rails with a spacer bar or a spreader bar extending between the rails and fixing their spaced positions. One form of spacer bar heretofore used embodied an angle iron spacer welded between the rails. For replacement of the rollers it was necessary to cut the angle iron spacers and reweld.

A feature of the present invention is the provision of a spacer bar which may be attached to the rails of a roller conveyor rapidly and simply with the use of an automatic wrenching machine and wherein the spacer bars are connected to the rails by threaded connectors.

Another feature of the invention is the provision of a method and apparatus capable of a relatively simple and inexpensive high speed manufacture of improved spacer bars and wherein the spacer bars will retain an accurate length and the manufacturing apparatus is not adversely affected by heat applied to the spacer bars.

Accordingly, an object of the present invention is to provide an improved mechanism and method for forming a spacer bar with an upset end and a flat end surface wherein the end surface will be accurately formed with respect to the length of the bar.

Another object of the invention is to provide an improved mechanism including an upset die apparatus for forming the end of a heated spacer bar wherein the heat of the bar does not adversely affect the operation of the die so as to vary the length of the spacer bar.

Another object of the invention is to provide an improved spacer bar structure such as may be used for roller conveyors.

Another object of the invention is to provide an improved method and apparatus for forming a spacer bar out of tubular material and for attaching a threaded stud to the spacer bar or for forming an opening for receiving a self-tapping bolt or screw.

Other objects and advantages will become more apparent with the teaching of the principles of the invention in connection with the disclosure of the preferred embodiments thereof in the specification, claims, and drawings, in which:

FIGURE 1 is a side elevational view of a roller conveyor employing spacer bars embodying the features of the present invention;

FIGURE 2 is a vertical sectional view taken substantially along line II—II of FIGURE 1 and illustrating the appearance of the roller conveyor in end sectional view;

FIGURE 3 is a greatly enlarged end elevational view of a spacer bar in accordance with the present invention;

FIGURE 4 is an elevational view, shown in somewhat schematic form, and shown partially in section, of a mechanism for performing the method of the invention and for forming the end of a spacer bar;

FIGURE 5 is a top plan view of a die mechanism embodying the principles of the present invention, for forming the end of a spacer bar;

FIGURE 6 is a vertical sectional view taken substantially along line VI—VI of FIGURE 5, with a spacer bar in position for forming;

FIGURE 7 is a vertical sectional view, similar to FIGURE 6, and showing the shape of the spacer bar after the end has been formed; and FIGURE 8 is a vertical sectional view, similar to FIGURE 7, but showing a modified form of the die for a spacer bar using a self-tapping bolt or screw for the connector.

As shown in the drawings:

FIGURES 1 and 2 illustrate a roller conveyor 11 with a pair of spaced U-shaped rails 12 and 13 extending down the sides of the conveyor. Extending between the rails are a plurality of spaced parallel rollers 14. The rollers are supported for free rotation on bearings 16 which may be in the form of rods extending across the rails or the like, as will be appreciated by those skilled in the art. The rollers are thus supported for free rotation for conveying an item which is rolled over the upper surface of the conveyor.

The rails must be held in fixed spaced relationship for supporting the rollers 14. For this purpose, spacing bars 17 extend between the rails and are connected at their ends to the rails.

The spacing bars 17 have an elongated central rod portion 18 with upset ends 19 and 20, as shown in FIGURE 2. The central portion 18 between the upset ends is preferably tubular. The tubular bar provides a cylindrical axial opening in the end for attaching the connecting members as will later become apparent. However, in some instances a solid bar 18 could be used.

Projecting axially from the upset ends 19 and 20 are threaded connectors 21 and 22. The connectors are in the form of threaded studs which are anchored in the ends of the bar 17.

Surrounding the stud, as illustrated in FIGURE 3, is an annular recess 23. While the recess is not to be limited to any particular shape, because of the advantages afforded by the shape of the die, as will later be described, the recess has a flat annular area 23a at its central deepest portion, and an outer tapered portion 23b tapering upwardly to the central portion 23a.

Outside of the recess 23 is a substantially flat planar area 24 which defines the axial end of the bar 17. The planar end area 24 is generally elongated in shape and has arcuate ends 24a with straight sides 24b. The sides are illustrated as substantially tangent to the annular recess 23.

Opposite the flat planar end 24, at one end of the bar 17, is a similar flat planar end 26 at the other end of the bar. These flat planar ends engage the inner flat surfaces 12a and 13a, respectively, of the side rails 12 and 13 of the conveyor. Nuts 27 and 28 are threaded onto the studs 21 and 22 to draw the side rails 12 and 13 tightly against the planar areas at the end of the bar 17. The bars are rotatably positioned so that the broad areas at the arcuate ends 24a extend in the direction of the rails.

Thus the rails are positively spaced and are held in rigid relationship by the bar 17. It will be apparent that since a plurality of bars 17 are employed, and since the rollers 14 must rotate freely, the bars must have an accurate length.

FIGURE 4 illustrates an apparatus for forming the ends of the spacer bars 17 in accordance with the invention. The mechanism includes a die assembly 29. The bar 17, as illustrated in FIGURE 4, is forced downwardly against the die assembly by a forcing apparatus 30. This apparatus includes a piston rod 31 having a lower surface 31a which engages the end of the bar 17. The piston has a recess 31b for accomodating the threaded connector 22 and permitting it to project up into the piston rod 31.

As will be apparent to those skilled in the art, for forming the first end of the bar 17, a separate die and forcing apparatus is employed which engages an end 39 of the tube 41 before the end 39 is upset. This is illustrated in FIGURES 6 and 7.

Returning to FIGURE 4, the piston rod 31 is connected to a piston 32 which is slidable within a cylinder 35. The piston is forced downwardly by pressurized operating fluid admitted through a connecting line 34 while a line 33 from the cylinder is vented. The piston is again raised by admitting pressurized fluid through the line 33 and venting the line 34. The movement of the piston 32 in a downward direction for upsetting the end of the bar 17 is limited by a stop bolt 37 which is threaded into a bracket 36 secured to the cylinder 35. A stop lug 38 strikes the end of the adjustable bolt 37 to limit the downward movement of the piston 32.

Thermal energy is applied to the bar 17 at the end 19 for aiding in plasticizing the metal for forming the upset. For this purpose, an electrical heating circuit 42 is provided. The circuit includes a transformer 43 with a control switch 44. Leads 45 and 46 are connected to the transformer and connect to the die 29, on one side of the circuit, and connect to brushes 47 and 48 at the other side of the circuit. The brushes are so located to engage the bar 17 at the location where it engages the die. This forms an electrical resistance circuit through the bar and resistance of the metal will cause a heating and a softening thereof. The electrical circuit is closed at the time a downward pressure is applied by the piston rod 31 to upset the end 19 of the bar 17.

As illustrated in FIGURES 5, 6, and 7, a die assembly 49 is provided for upsetting the end of the bar 41. The bar is provided in the form of a hollow tube which is forced downwardly with an upsetting force applied in the direction of the arrow 40.

The die assembly includes an upper die member 51 supported by a lower die member 52. The upper die member has a die opening 53 which extends fully through the die member. The opening has a side wall 54, which is elongated in shape and has arcuate ends 54a and straight sides 54b. This achieves the shape of the upset end of the bar, as illustrated in FIGURE 3. The side walls of the opening may be relieved on the order of 7° for easy removal of the part after upset or gather of the end. The upper die member 51, which is basically in the shape of a flat plate, is positioned at the top surface of the lower die member or block 52 by dowel pins 58 and 59. The dowels project through holes 56 and 57 in the die plate 51 and are seated in holes 60 and 61 in the die block 52.

The die block 52 has a substantially flat planar surface 62 which is located in the bottom of the die recess defined by the opening 53. The planar area 62 forms the flat planar end 69 of the gathered end 68 of the bar 41, as shown in FIGURE 7.

At the center of the planar area 62 is a boss 63 having a flat upper surface 63a and tapered sides 63b. The boss forms a recess 71 in the gathered end 68 of the bar.

The provision of the boss serves a two-fold purpose in providing perimeter support of the bar against the rail of the conveyor and in helping to hold a close over all length tolerance of the bar.

After a few bars are formed by gathering of the ends, the die becomes very hot especially in the center. The initial pressure of the tube 41 against the die, just before the gathering begins, causes an indentation or pitting in the die. This indentation will become progressively deeper as more parts are gathered. For example, an indentation of .030 may result after 75 to 100 parts are gathered. If this area were at the bottom of the die, or in other words, formed part of the planar area 62, the over all length of the bar would keep changing. Thus the bearing surface against the rails would be the raised area which would be formed in the part which was gathered in the pit of the die. With the present structure however, the gather is formed below the pitter area so that the bearing surface and over all length are consistent.

In the arrangement of FIGURES 5, 6, and 7, a threaded connector stud 66 is provided. This is set into a cylindrical recess 64 in the center of the die. As the end 68 of the bar 41 gathers, it is squeezed around the stud 66 so that the stud is firmly secured in the center of the bar. The stud is then formed as a part of the bar for the receipt of a nut which is threaded on the end when the bar is positioned properly in a conveyor. The stud 66 projects from the center of the bar at the center of the recess 71 which is formed by the boss 63. Threading a nut over the end of the stud will draw the flat planar area 69 at the end of the bar against a surface which forms a reference surface for the bar 41.

In the arrangement of FIGURE 8, a self-tapping bolt or screw is used for attaching the bar 72 in place. In this arrangement, the die assembly 73 is substantially identical to the die assembly 49 of FIGURES 6 and 7. A central threaded opening 74 is provided however, which receives a tapered plug 76. The plug is threaded into the opening 74 and has a tapered end portion 77 projecting upwardly from the die opening 79. The portion 77 is tapered on the order of 20°. When the bar 72 is gathered in the die opening 79, a tapered opening 78 will be formed on the inside of the end of the bar. This opening 78 will later receive a self-tapping screw for attaching the bar 72 in operating position.

The die assembly 29 is substantially identical with the die 49, and therefore need not be described in detail. In some conditions the same die may be used and the difference between the gathering operation in FIGURE 4 and FIGURES 6 and 7 resides in the difference in the distance between the piston and the die since in FIGURES 7 and 8 the first end of the rod is gathered and in FIGURE 4 the second end of the rod is gathered. The die 29 has a die opening 81 with a protuberance or boss 82 rising above the center of a flat planar area 83. In the center of the boss 82 is a cylindrical opening 84 for receiving the stud 21.

In operation, the stud 66 is set in the opening 64 of the die assembly 49 with the tubular bar 41 placed over the stud FIG. 6. A vertical gathering pressure is applied in the direction of the arrow 40 and the lower end 67 is heated, such as by a mechanism shown at 42 in FIGURE 4. The end 68 will be flared and gathered in the manner illustrated in FIGURE 7, in the shape shown in FIGURE 3. The flattening sides 24b of the end will aid in forming firm contact between the gathered end and the stud 66. The sides 246 also provide a surface area for accommodating a holding wrench, if desired, when the conveyor is assembled. When the gathered end 68 is formed, with its planar surface 69, the bar 41 is removed from the die 49, and placed in a mechanism such as shown in FIGURE 4 and the other end gathered. Since pitting and deformation caused by heat will be localized in the boss 63 in the center of the die 49, and in the boss 82 in the center of the die 29, the outer flat planar die surfaces 62 and 83, respectively, will remain accurate thereby resulting in a bar having an accurate length.

Thus it will be seen that I have provided an improved method and apparatus for forming a spacer bar or the like of improved constructional features, meeting the objectives and advantages herein before set forth. The apparatus and method is well adapted to resistance heat gathering and to production manufacturing without constant attention to the die surfaces and concern as to the accuracy of the length of the finished product. A structure of improved and more accurate characteristics results with the present method and apparatus.

I have, in the drawings and specification, presented a detailed disclosure of the preferred embodiments of my invention, and it is to be understood that I do not intend to limit the invention to the specific forms disclosed, but intend to cover all modifications, changes and alternative constructions and methods falling within the scope of the principles taught by my invention.

I claim as my invention:

1. A mechanism for forming the ends of elongated spacer bars or the like having an accurate finished length comprising a die member having a die opening, a planar area within said opening extending in a plane at right angles to the axis of a spacer bar to be formed, a wall area extending upwardly at the outer edge of said planar area and being larger than the end of a spacer bar leaving space for enlargement of the spacer bar end within the wall, a raised boss within said planar area spaced inwardly from said wall area, an elongated axial recess substantially in the center of said raised boss for supporting a pin to be integrally attached to the spacer bar, means for heating only the first end of a bar located in said die opening, means for engaging the opposite end of the bar and for forcing the first end of the bar against said die member, and means positioned a distance from said die member for limiting the movement of said forcing means to movement of a distance so that said opposite end is a predetermined distance from said planar area only sufficient to enlarge the first end of the spacer bar and to expand it only to said wall area.

2. A mechanism for forming the ends of elongated spacer bars or the like having an accurate finished length comprising a die member having a die opening, a planar area within said opening extending in a plane at right angles to the axis of a spacer bar to be formed, a wall area extending upwardly at the outer edge of said planar area and being larger than the end of a spacer bar leaving space for enlargement of the spacer bar end within the wall, a raised boss within said planar area spaced inwardly from said wall area, an elongated protuberance projecting axially upwardly from said boss for forming an opening for inserting a connecting member into the end of the bar, means for heating only the first end of a bar located in said die opening, means for engaging the opposite end of the bar and for forcing the first end of the bar against said die member, and means positioned a distance from said die member for limiting the movement of said forcing means to movement of a distance so that said opposite end is a predetermined distance from said planar area only sufficient to enlarge the first end of the spacer bar and to expand it only to said wall area.

3. A mechanism for forming the ends of elongated spacer bars or the like having an accurate finished length comprising a die member having a die opening, an elongated planar area having a length greater than the width, and positioned within the die opening extending in a plane at right angles to the axis of a spacer bar to be formed, a raised boss within said planar area, means for heating only a first end of a bar located in said die opening, means for engaging the opposite end of the bar and for forcing the first end of the bar against said die member, and means positioned a distance from said die member for limiting the movement of said foricng means to movement of a distance so that said opposite end is a predetermined distance from said planar area only sufficient to enlarge the first end of the spacer bar and to expand it only to said wall area.

4. A mechanism for forming the ends of elongated spacer bars or the like having an accurate finished length comprising a die member having a die opening, a planar area within said opening extending in a plane at right angles to the axis of a spacer bar to be formed, a wall area extending upwardly at the outer edge of said planar area and being larger than the end of a spacer bar leaving space for enlargement of the spacer bar and within the wall area, a raised boss within said planar area spaced inwardly from said wall area, means for engaging the end of a bar opposite the end being formed and forcing the bar against said die member, and means positioned a distance from said die member for limiting the movement of said forcing means to a predetermined distance from said planar surface and to movement of a distance only sufficient to enlarge the end of a spacer bar and to expand it only to said wall area.

5. The method of forming a planar end surface on a first end of a spacer bar or the like which comprises first applying thermal energy only to a first end of a bar to be shaped, next engaging the other end of the bar and forcing the first heated end of the bar axially against a raised portion on a planar surface, forcing the heated material of said first end of the bar axially inwardly in the center of said first end with the bar spreading and engaging the planar surface to form a planar end for determining the finished end length of the bar whereby the outer cooler portions of the planar surface will determine said length, and limiting the forcing of said other end of the bar terminating the force when said other end is a predetermined distance from said planar surface.

6. The method of forming an end on a spacer bar or the like to provide a bar of predetermined length comprising applying thermal energy only to a first end of a bar to be shaped, forcing said heated first end of the bar axially against a raised portion on a planar surface to form an indented recess and a planar end for determining the finished end length of the bar, radially holding the sides of the first end of the bar to limit the spreading while contacting the planar surface and while a projection is held inside of an opening extending from said recess in the first end of the bar so that the bar end will compress against the projection, and limiting the axial forcing of the bar when the second end of the bar is a predetermined distance from said planar surface.

7. A method of forming an end of a spacer bar to provide a bar of a predetermined length comprising applying thermal energy only to a first end of a tubular bar to be shaped, positioning an elongated connector member in said first end of the bar to project from the end thereof, forcing said heated first end of the bar axially against a raised portion on a planar surface to form an indented recess surrounding said connector member and to form a planar end for determining the finished end length of the bar, forcing material at said first end of the bar axially inwardly around said connector member so that it will form radially inwardly against said connector member holding said connector member within the bar, and limiting the axial forcing of the bar when the second end of the bar is a predetermined distance from said planar surface.

References Cited in the file of this patent

UNITED STATES PATENTS

| Number | Name | Date |
|---|---|---|
| 432,630 | Lemp | July 22, 1890 |
| 1,514,335 | Phelps | Nov. 4, 1924 |
| 1,548,926 | Alvey | Aug. 11, 1925 |
| 1,695,075 | Zimmerman | Dec. 11, 1928 |
| 2,178,032 | Clausen | Oct. 31, 1939 |
| 2,252,129 | Kratky | Aug. 12, 1941 |
| 2,275,763 | Howard et al. | Mar. 10, 1942 |
| 2,313,067 | Heath | Mar. 9, 1943 |
| 2,325,480 | Crawford | July 27, 1943 |
| 2,625,635 | Westin et al. | Jan. 13, 1953 |
| 2,667,558 | Aeckersberg et al. | Jan. 26, 1954 |